US011142649B2

(12) United States Patent
Suzuki et al.

(10) Patent No.: US 11,142,649 B2
(45) Date of Patent: Oct. 12, 2021

(54) α-ALUMINA FLAKES

(71) Applicant: Merck Patent GmbH, Darmstadt (DE)

(72) Inventors: Ryuta Suzuki, Fukushima Ken (JP); Gerhard Pfaff, Muenster (DE); Sabine Schoen, Herten (DE); Fumiko Sasaki, Iwaki (JP); Satoru Kobayashi, Fukushima (JP); Koshiro Kunii, Fukushima Ken (JP); Yuji Takenaka, Iwaki (JP); Katsuhisa Nitta, Fukushima Ken (JP)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 16/460,292

(22) Filed: Jul. 2, 2019

(65) Prior Publication Data

US 2019/0330475 A1 Oct. 31, 2019

Related U.S. Application Data

(62) Division of application No. 14/261,458, filed on Apr. 25, 2014.

(30) Foreign Application Priority Data

Apr. 30, 2013 (EP) ...................... 13002294

(51) Int. Cl.
| | |
|---|---|
| C09C 1/40 | (2006.01) |
| C09C 1/00 | (2006.01) |
| C01F 7/02 | (2006.01) |
| C01F 7/34 | (2006.01) |
| C01F 7/44 | (2006.01) |
| C09D 7/40 | (2018.01) |
| C09D 7/62 | (2018.01) |
| C08K 3/22 | (2006.01) |

(52) U.S. Cl.
CPC .............. C09C 1/407 (2013.01); C01F 7/02 (2013.01); C01F 7/34 (2013.01); C01F 7/441 (2013.01); C09C 1/0018 (2013.01); C09C 1/0021 (2013.01); C09C 1/0024 (2013.01); C09C 1/0039 (2013.01); C09C 1/0051 (2013.01); C09C 1/0066 (2013.01); C09D 7/62 (2018.01); C09D 7/70 (2018.01); C01P 2002/52 (2013.01); C01P 2002/84 (2013.01); C01P 2004/20 (2013.01); C01P 2004/24 (2013.01); C01P 2004/51 (2013.01); C01P 2004/54 (2013.01); C01P 2004/61 (2013.01); C08K 3/22 (2013.01); C09C 2200/1004 (2013.01); C09C 2200/301 (2013.01); Y10T 428/2982 (2015.01)

(58) Field of Classification Search
None
See application file for complete search history.

(56) References Cited

U.S. PATENT DOCUMENTS

| | | |
|---|---|---|
| 5,571,851 A | 11/1996 | Freeman et al. |
| 5,702,519 A | 12/1997 | Nitta et al. |
| 6,197,277 B1 | 3/2001 | Fukuda et al. |
| 6,306,788 B1 | 10/2001 | Watanabe et al. |
| 6,417,250 B2 | 7/2002 | Kieser et al. |
| 6,596,070 B1 | 7/2003 | Schmidt et al. |
| 6,641,874 B2 | 11/2003 | Kuntz |
| 7,067,157 B2 | 6/2006 | Fukuda et al. |
| 7,387,669 B2 | 6/2008 | Mronga et al. |
| 7,485,183 B2 | 2/2009 | Hochstein et al. |
| 7,820,088 B2 | 10/2010 | Josephy et al. |
| 7,959,894 B2 | 6/2011 | Lee et al. |
| 7,993,746 B2 | 8/2011 | Lee et al. |
| 8,088,212 B2 | 1/2012 | Bagala, Sr. |
| 8,287,636 B2 | 10/2012 | Lee et al. |
| 8,329,153 B2 | 12/2012 | Suenaga et al. |
| 8,728,227 B2 | 5/2014 | Schumacher et al. |
| 9,683,105 B2 | 6/2017 | Kitamura |
| 9,909,010 B2 | 3/2018 | Schmidt |
| 10,253,191 B2 | 4/2019 | Shimizu et al. |
| 10,647,861 B2 | 5/2020 | Suzuki et al. |
| 2003/0097965 A1 | 5/2003 | Heider et al. |
| 2004/0265507 A1 | 12/2004 | Xiong et al. |
| 2006/0022391 A1 | 2/2006 | Chen |
| 2006/0027141 A1 | 2/2006 | Tarng et al. |
| 2006/0053975 A1 | 3/2006 | Shibahashi et al. |
| 2006/0223910 A1 | 10/2006 | Bagala |
| 2009/0186225 A1 | 7/2009 | Lee et al. |
| 2009/0320719 A1 | 12/2009 | Lee et al. |
| 2010/0001544 A1 | 1/2010 | Paley |
| 2010/0015445 A1 | 1/2010 | Lee et al. |
| 2010/0029704 A1 | 2/2010 | Hanma et al. |
| 2010/0159146 A1 | 6/2010 | Chilla |

(Continued)

FOREIGN PATENT DOCUMENTS

| | | |
|---|---|---|
| CN | 1150165 A | 5/1997 |
| CN | 1263877 A | 8/2000 |

(Continued)

OTHER PUBLICATIONS

"Analysis report relating to particle distribution of Xirallic® pigment T60-10", Mastersizer, 2018, XP055577938.

(Continued)

Primary Examiner — Ronak C Patel

(74) Attorney, Agent, or Firm — Millen White Zelano & Branigan; Csaba Henter

(57) ABSTRACT

The present invention relates to alumina flakes having a defined thickness and particle size distribution and to their use in varnishes, paints, automotive coatings printing inks, masterbatches, plastics and cosmetic formulations and as substrate for effect pigments.
and organic dyes.

20 Claims, No Drawings

(56) References Cited

U.S. PATENT DOCUMENTS

| | | |
|---|---|---|
| 2010/0297045 A1 | 11/2010 | Kaupp et al. |
| 2011/0052485 A1 | 3/2011 | Seo et al. |
| 2011/0226161 A1 | 9/2011 | Schumacher et al. |
| 2011/0237683 A1 | 9/2011 | Schmid et al. |
| 2014/0322536 A1 | 10/2014 | Suzuki et al. |
| 2020/0032067 A1 | 1/2020 | Schmid et al. |

FOREIGN PATENT DOCUMENTS

| | | |
|---|---|---|
| CN | 1513039 A | 7/2004 |
| CN | 1875074 A | 12/2006 |
| CN | 101146745 A | 3/2008 |
| CN | 101189306 A | 5/2008 |
| CN | 101541681 A | 9/2009 |
| CN | 101695466 A | 4/2010 |
| CN | 102014864 A | 4/2011 |
| CN | 101541681 B | 11/2011 |
| CN | 102292401 A | 12/2011 |
| CN | 102741358 A | 10/2012 |
| CN | 101535419 B | 11/2012 |
| CN | 101965383 B | 7/2013 |
| CN | 102741358 B | 11/2015 |
| EP | 0634459 B1 | 4/2001 |
| EP | 1148028 A2 | 10/2001 |
| EP | 2799398 B1 | 5/2018 |
| JP | 2001-232284 A | 8/2001 |
| JP | 2008534753 A | 8/2008 |
| JP | 2010502539 A | 1/2010 |
| JP | 2010502774 A | 1/2010 |
| WO | 06101306 A1 | 9/2006 |
| WO | 2006110359 A2 | 10/2006 |
| WO | 08026829 A1 | 3/2008 |
| WO | 2008026860 A1 | 3/2008 |
| WO | 2009103322 A1 | 8/2009 |
| WO | 2012084097 A1 | 6/2012 |
| WO | 13085049 A1 | 6/2013 |
| WO | 14094993 A1 | 6/2014 |

OTHER PUBLICATIONS

Anonymous: "Particle Size Analysis Report Xirallic® T60-10", Malvert Instruments—Mastersizer Ver. 5.1, Dec. 16, 2006 (Dec. 16, 2006), XP055576988.
Anonymous: "Xirallic® F60-50 SW Fireside Copper", Merck—Technical Data Sheet, Oct. 1, 2002 (Oct. 1, 2002), XP055576983.
Anonymous: "Xirallic® F60-51 SW Radiant Red", Merck—Technical Data Sheet, Oct. 1, 2002 (Oct. 1, 2002), XP055576984.
Anonymous: "Xirallic® Pigments T60-10 SW Crystal Silver", Merck—Technical Data Sheet, Oct. 1, 2002 (Oct. 1, 2002), XP055576965.
Anonymous: "Xirallic® T60-21 SW Solaris Red", Merck—Technical Data Sheet, Oct. 1, 2002 (Oct. 1, 2002), XP055576979.
Anonymous: "Xirallic® T60-20 SW Sunbeam Gold", Merck—Technical Data Sheet, Oct. 1, 2002 (Oct. 1, 2002), XP055576975.
Anonymous: "Xirallic® T60-23 SW Galaxy Blue", Merck—Technical Data Sheet, Jan. 1, 2003 (Jan. 1, 2003), XP055576981.
Elke Cwiertnia: "Perlglanzpigmente", Seminararbeit, May 9, 2008 (May 9, 2008), Dresden, pp. 88-89, XP055576969.
Sigrid Teaney et al: "New effect pigments using innovative substrates", Eur. Coat. J, vol. 4, Apr. 1999 (Apr. 1, 1999), pp. 434-439, XP055567514.
"Technical Data Sheet of Xirallic® pigment T60-10", Merck, Oct. 2002 (Oct. 1, 2002), XP055577899.
"Technical Data Sheet of Xirallic® pigment T60-20", Oct. 2002 (Oct. 1, 2002), XP055577902.
"Technical Data Sheet of Xirallic® pigment T60-21", Merck, Oct. 2002 (Oct. 1, 2002), XP055577904.
"Technical Data Sheet of Xirallic® pigment T60-23", Merck, Oct. 2002 (Oct. 1, 2002), XP055577908.
"Technical Data Sheet of Xirallic® pigment F60-50", Merck, Oct. 2002 (Oct. 1, 2002), XP055577933.
"Technical Data Sheet of Xirallic® pigment F60-51", Merck, Oct. 2002 (Oct. 1, 2002), XP055577935.
J.J. Ponjee, Philips Technical Review, vol. 44, No. 3, pp. 81.
P.H. Harding; J.C. Berg, J. Adhesion Sci. Technol., vol. 11, No. 4, pp. 471-493.
Notice of Opposition in corresponding EP Appl. No. 14001292.3 dated Feb. 28, 2019 {pp. 1-24). Opponent PPG Industried.
Notice of Opposition in corresponding EP Appl. No. 14001292.3 dated Feb. 28, 2019 {pp. 1-28). Opponent o. WA Sweden AB.
DB-Merck Xirallic pigments webpage hllps://www.emdgroup.com/en/brands/pm/xirallic.html {pp. 1-7).
C15-Pe glanzpigmente {pp. 1-4) Author:Eike Cwiertnia Publication data:Seminararbeit, May 9, 2008 Dresden.
Office Action dated Jul. 13, 2018 2018 issued in corresponding EP 18171606.9application (11 pages).
Taiwan Office Action dated Jul. 22, 2018 issued in corresponding TW 103115053 application (9 pages).
Japanese Office Action dated Jan. 9, 2018 issued in corresponding JP 2014-093904 application (II pages).
Taiwan IPO Search Report dated Jan. 25, 2018 issued in corresponding TW 103115053 application (2 pages).
Chinese Office Action dated Nov. 15, 2016 issued in corresponding Chinese Application No. 201410166651.8, 7 pages.
European Search Report related to corresponding European Patent Application No. 14001291, dated Oct. 13, 2014.
Partial Translation of Notice of Grounds for Revocation in JP Opposition No. 2019-700326 dispatched Jul. 4, 2019 (pp. 1-9).
D22-Gerhard Pfaff et al: Special Effect Pigments: Technical Basics and Applications—2nd Revised Edition 2008 ; SBN: 3-86630-905-8 (pp. 72-74).
Measurements of Xirallic F60-51 SW (Author /date unknown) (pp. 1-3).
D2 Technical Data Sheet 58028 Xirallic F60-10 SW crystal Silver, Merck Oct. 2002 (1 page).
Korean Appl. 10-2014-0051448 Opinion according to the Notification of Reasons for Refusal dated Oct. 26, 2020 (pp. 1-8).
U.S. Appl. No. 16/460,244, filed Jul. 2, 2019.
U.S. Appl. No. 16/843,395, filed Apr. 8, 2020.
U.S. Appl. No. 16/843,397, filed Apr. 8, 2020.
1002 Expert Declaration of Jack A. Ladson, pp. 15-150, Feb. 2021.
1004 Choi: Declaration of Byung-Ki Choi (Feb. 8, 2021), pp. 1-15.
1006 Xirallic® Technical Data Sheet, T60-20 SW Sunbeam Gold, Merck KGaA (Oct. 2002), p. 1 (author unknown).
1011 Xirallic® Certificate of Analysis, T60-10 SW Crystal Silver, Batch No. N120046S28, Merck KGaA (Jun. 25, 2012), p. 1 (author unknown).
1012 Xirallic® Certificate of Analysis, T60-20 SW Sunbeam Gold, Batch No. H120167S26, Merck KGaA (Jun. 27, 2012), p. 1 (author unknown).
1013 Xirallic® Certificate of Analysis, F60-50 SW Fireside Copper, Batch No. H120075S30, Merck KGaA (Mar. 28, 2012), p. 1 (author unknown).
1014 Xirallic® Certificate of Analysis, F60-50 SW Fireside Copper, Batch No. H120314S30, Merck KGaA (Oct. 30, 2012), p. 1 (author unknown).
1015 Xirallic® Certificate of Analysis, F60-51 SW Radiant Red, Batch No. N11008831S, Merck KGaA (Aug. 8, 2011), p. 1 (author unknown).
1016 Xirallic® Certificate of Analysis, T60-21 SW Xirallic®, Batch No. HI 1030347S, Merck KGaA (Aug. 18, 2011), p. 1 (author unknown).
1017 Xirallic® Certificate of Analysis, T60-21 SW Solaris Red, Batch No. H130162S47, Merck KGaA (Jun. 4, 2013), p. 1 (author unknown).
1018 Mo: Declaration of SeungHoon Mo, (Feb. 2, 2021), pp. 1-7.
1019 Mo: Experimental Report: Merk KGaA Xirallic Sample Analysis (Apr. 10, 2020), pp. 1-21.
1020 Pretreatment for SEM: Preparation of cured paint film (Apr. 10, 2020), pp. 1-8 (author unknown).
1021 Kang: Declaration of KwangChoong Kang (Feb. 2, 2021), pp. 1-4.
1022 Particle Size Analysis Report: Xirallic® T60-10 SW Crystal Silver (Dec. 16, 2006), p. 1 (author unknown).

(56) References Cited

OTHER PUBLICATIONS

1023 CQV Quality Inspection Method (QIM) re Malvern Mastersizer 2000, p. 1 (author unknown).
1024 Rovinsky: Chain of Custody Form—Chemical Sample re Xirallic F60-51, Batch No. UI21277S31, Axalta Coating Systems to CQV (Apr. 1, 2020), pp. 1-5.
1025 Material Safety Data Sheet: Xirallic® F60-51 SW Radiant Red (Nov. 22, 2006), pp. 1-5 (author unknown).
1028 Wirtschaftsprufer: Merck KGaA Annual Report (2005), pp. 1-120.
1038 GlobalData Search Report—Merck KGaA Locations and Subsidiaries (2021), pp. 1-19 (author unknown).
1040 Notice of Opposition against EP2799398 and supporting documents filed Feb. 22, 2019, pp. 1-5 and 1-19 plus technical data sheets.
1041 Merck's Response to Notice of Opposition against EP2799398 filed Sep. 16, 2019, pp. 1-14.
1045 CQV Certificate of Analysis, MAX-791P, Multiorora® Axion Crystal Green, Lot No. Z20KR11505, author unknown.
1046 Choi: Engelhard Certificate of Analysis, MagnaPearl 1100, Batch No. 1100511201 (Dec. 1, 2003), p. 1.
1047 Kahle: Email communications between Martin Kahle and CQV (dated Feb. 18, 2014 through Feb. 21, 2014), pp. 1-5.
1048 Certificate of Training to Seunghoon Mo from Daeil Microanalytical Laboratory (DML) Analysis Research Institute, Seoul, South Korea, Oct. 19, 2018., pp. 1-3.
1049 Certificate of Training to Seunghoon Mo from Malvern Panalytical, Seongnam, South Korea, Sep. 18, 2018., pp. 1-3.
1050 Guo, H., "A Simple Algorithm for Fitting a Gaussian Function", IEEE Signal Processing Magazine, vol. 28, No. 5, Sep. 2011, pp. 134-137.
1051 Greenstein, L.M., Nacreous (Pearlescent) Pigments and Inteiference Pigments, Pigment Handbook, vol. 1, 2nd ed., John Wiley & Sons, Inc. (1988), pp. 829-858.
1052 Aluminum Oxide I AhO3—PubChem (https://pubchem.ncbi.nlm.nih.gov/compound/ Aluminum-oxide) (Jan. 31, 2021), pp. 1-38 (author unknown).
1053 Born, M. et al., Principles of Optics—Electromagnetic Theory of Propagation, Interference and Diffraction of Light, 2nd ed., The Macmillan Company (1964), pages xxii, 44, 257-261.
1054 Bass, M. et al., Handbook of Optics, vol. 1, 2nd ed., McGraw-Hill, Inc. (1995), pp. 2.31-2.34.
1055 The Feynman Lectures on Physics, Chapter 33, vol. I, Polarization (https://www.feynmanlectures.caltech.edu/11_33.html), pp. 1-13 (author unknown).
1032 Teaney et al., "New effect pigments using innovative substrates" Eur. Coat. J. (4) (1999) 90 ("Teaney").
1034 Pfaff, G. et al., "Special Effect Pigments" 2nd rev. ed., Vincentz Network GmbH & Co., Hannover, Germany (2008) (pp. 72-74) ("Pfaff").
Office Action in corresponding CN 201910088351.5 dated Jun. 24, 2020 (pp. 1-14).
Office Action in corresponding CN 201910088351.5 dated Mar. 31, 2021 (pp. 5-14).
Notice of Opposition in corresponding EP3395763 dated Mar. 15, 2021 (pp. 1-14).
TOS of Xirallic® F60-50 SW Fireside Copper, date: unknown author: unknown (1 Page). (2a).
Certificate of Analysis of Xirallic® F60-50 SW Fireside Copper, batch No. H07022030S (D2b) date: unknown author: unknown (1 Page).
Certificate of Analysis of Xirallic® F60-50 SW Fireside Copper, batch No. H120075S30 )D2c).
Safety date sheet of Xirallic® F60-50 SW Fireside Copper, (D2d) date: unknown author: unknown (1 Page).
TOS of Xirallic® F60-51 SW Radiant Red, date: unknown author: unknown (1 Page). (3a).
Certificate of Analysis of Xirallic® F60-51 SW Radiant Red, batch No. N11008831S (D3b), date: unknown author: unknown (1 Page).
Safety data sheet of Xirallic® F60-51 SW Radiant Red,(D3c) date: unknown author: unknown (1 Page).
Safety data sheet of Xirallic® T50-10 Crystal Silver (D4a), date: unknown author: unknown (1-4 Pages).
Certificate of Analysis of Xirallic® T50-10 Crystal Silver, batch No. H11041769X date: unknown author: unknown (1 Page).
Experimental report—Affidavit of Byung-Ji Choi, Apr. 10, 2020 (D5a) (pp. 1-2).
SeungHoon Mo: Experimental report—Attachment 1 (pp. 1-21), Apr. 10, 2020.
Experimental report—Attachment 2 (Pretreatment for SEM) (pp. 1-8) Date: unknown Author: Unknown.
Wikipedia : File:Car shape fireside copper Xirallic red.jpg—(pp. 1-3) downloaded from Wikipedia on Feb. 3, 2021; Author: Unknown, Source: Merck KGaA Germany.
Huber: Summary of presentations at GOCH-Tagung in Eisenach, Sep. 21-23, 2005, Fachgruppe "Anstrichstoffe und Pigmente", at pp. 18 and 19 (1-44 pages).
Frank J. Maile et al.: Progress in Organic Coatings 54 (2005) 150-163 "Effect pigments—past, present and future" Merck KGaA (D34).
Consolidated List in EP 14001291.5 dated Apr. 26, 2021 (2 pages).

α-ALUMINA FLAKES

The present invention relates to α-$Al_2O_3$ flakes and to the use thereof in paints, industrial coatings, automotive coatings, printing inks, cosmetic formulations and in particular as transparent substrate for effect pigments.

Imparting a pearlescent luster, metallic luster, color flop or multicolor effect can be achieved by using pearlescent pigments based on natural or synthetic transparent flakes. Pearlescent pigments based on α-$Al_2O_3$ flakes are well-known in the literature and commercially available under the trademark Xirallic® from Merck.

The important factors of a substrate for an effect pigment are the particle size, shape, surface property, refractive index and the like. Since large and small particles have different proportions of reflection and transmission of light on the particle surface, uniformness in particle size is essential for a vivid and uniform color. Also the particle size greatly affects the coloration of the pearlescent pigment because it is closely related with the wavelength of the light. That is, the smaller the particle size, the larger the surface area, thereby increasing the coloration and enhancing reflectivity, and offering a more vivid color. However, in coating metals or metal oxides on the surface of the $Al_2O_3$ flakes, it is usually not easy to provide uniform coatings on them and thus results in a decrease in the aspect ratio, which then reduces the effect of light interference thus deteriorating glossiness of the resulting pearlescent colors.

α-$Al_2O_3$ in the form of hexagonal flakes having a particle diameter greater than 10 μm and an aspect ratio (particle diameter/thickness) of 5-10 is known from Japanese Patent Publication No. 111239/1982.

The Japanese Patent Publication No. 72572/1991 discloses α-$Al_2O_3$ in the form of flakes having an average particle diameter of 0.5-3 μm.

The Japanese Patent Publication No. 39362/1992 describes $Al_2O_3$ in the form of fine platy particles of a hexagonal crystal system with the plane perpendicular to the c axis grown into a plate.

$Al_2O_3$ flakes composed of aluminum oxide (as a major constituent) and of titanium dioxide (as a minor constituent) are disclosed in U.S. Pat. No. 5,702,519. The $Al_2O_3$ flakes have an average particle diameter of about 5-60 μm, a thickness less than 1 μm, and an aspect ratio of >20.

WO 2006/101306 A1 and WO 2008/026829 A1 relate to zinc doped $Al_2O_3$ flakes and to pearlescent pigments based on these $Al_2O_3$ flakes. The $Al_2O_3$ flakes have an average thickness of 0.5 μm or less and an average particle diameter of ≥15 μm and a large aspect ratio (diameter/thickness) of ≥50 μm. These zinc doped $Al_2O_3$ flakes are not stable under acidic conditions and thus not suitable for all applications.

The $Al_2O_3$ flakes of the prior art have the disadvantages that they do not have a high chemical stability and/or have not the desired smoothness for the use of the flakes in cosmetic and paint applications.

The object of the present invention is to provide improved $Al_2O_3$ flakes having at the same time a high chemical stability, a smooth surface and high whiteness.

Surprisingly, it has now been found that the properties of the alumina flakes as such and of effect pigments based on alumina flakes can be increased by using alumina flakes with precisely defined dimensions and particle size distribution. Especially the optical properties of the alumina flakes and the effect pigments based on alumina flakes can be influenced by altering the particle size distribution.

Thus, the present invention relates to transparent alumina flakes which are distinguished by the fact that they have a thickness of ≥500 nm and a $D_{90}$-value of 30-45 nm and a $D_{50}$-value of 15-30 μm.

Compared to the prior art, the $Al_2O_3$ flakes according to the present invention show improved optical properties, in particular by their shimmer or glimmer effect combined with an increased chroma and luster and at the same time show a high chemical stability in all applications.

Since the coated and uncoated $Al_2O_3$ flakes according to the invention combine high gloss with intense interference colors and highly pronounced glitter effects, particularly effective effects can be achieved with them in various application media.

The alumina flakes according to the invention are used, in particular, as substrate for effect pigments, especially for the use in industrial applications. However, they can also be employed in all formulations where alumina flakes are usually employed, such as, for example, in inks, coatings, preferably automotive coatings, plastics, cosmetic formulations and as substrate for effect pigments.

The $Al_2O_3$ flakes of this invention have a particle size distribution characterized by a Gaussian distribution in which the volume size fractions are distributed as follows:

$D_{50}$ is in the range of 15-30 μm, preferably 15-25 μm $D_{90}$ is in the range of 30-45 μm, preferably 30-40 μm.

In this patent application $D_{10}$, $D_{50}$ and $D_{90}$ of the alumina flakes are evaluated by using Malvern MS2000.

The particle size distribution $D_{50}$ is also known as the median diameter or the medium value of the particle size distribution, it is the value of the particle diameter at 50% in the cumulative distribution and is one of the important parameter characterizing the particle size of pigments.

Correspondingly, the $D_{90}$ value indicates the maximum longitudinal dimensions of the $Al_2O_3$ flakes, as determined again by means of laser granulometry in the form of sphere equivalents, which 90% of the particles attain at maximum, or fall below, out of the entirety of all $Al_2O_3$ particles.

In a preferred embodiment, the $Al_2O_3$ flakes according to the present invention have a standard deviation of thickness distribution of less than 80, preferably 5-60 and in particular 10-50.

In a preferred embodiment the $D_{10}$ value of the alumina flakes according to the present invention is <9.5, preferably ≤9.0.

The $D_{10}$ value indicates the value of the longitudinal dimension of the $Al_2O_3$ flakes, as determined by means of laser granulometry in the form of the sphere equivalent, which 10% of the flakes attain at most, or fall below, out of the entirety of all the $Al_2O_3$ flakes.

The average thickness is determined on the basis of a cured paint film in which the $Al_2O_3$ flakes are oriented substantially plane-parallel to the substrate. For this purpose a transverse section of the cured paint film is examined under a scanning electron microscope (SEM), the thickness of 100 $Al_2O_3$ flakes being ascertained and statistically averaged.

The desired size and thickness distribution can be obtained by suitable classification of the flakes, such as by classifying through selected screens and the like.

The $Al_2O_3$ flakes according to the invention have a thickness of ≥500 nm, preferably 550-1000 nm, in particular 600-900 nm.

The $Al_2O_3$ flakes according to the invention preferably have an aspect ratio (diameter/thickness ratio) of 15-60, in particular of 20-45.

In a preferred embodiment the $Al_2O_3$ flakes of the present invention are $\alpha$-$Al_2O_3$ flakes.

The $Al_2O_3$ flakes according to the invention can be prepared by methods known per se, as described in the literature.

In a preferred embodiment the $Al_2O_3$ flakes are prepared starting from an aqueous aluminum salt solution by precipitation with an aqueous alkali carbonate solution. An alkali metal salt like sodium or potassium sulfate and phosphoric acid or phosphate as well as a dopant like a titanium compound are added to the starting solution. The precipitation step is followed by drying (evaporation, dehydration by heating) and molten salt treatment including the following steps:

The $Al_2O_3$ flakes can be prepared by methods known per se, as described in the literature.

In a preferred embodiment the $Al_2O_3$ flakes are prepared starting from an aqueous aluminum salt solution by precipitation with an aqueous alkali carbonate solution. An alkali metal salt like sodium or potassium sulfate and phosphoric acid or and phosphate as and optionally at least one dopant, for example a titanium, zirconium, silica, indium, tin, zinc or indium compound are added to the starting solution. The precipitation step is followed by drying (evaporation, dehydration by heating), and molten salt treatment including the following steps:

(1) Preparation of an aqueous solution or a slurry of at least one water-soluble and/or insoluble aluminum salt,
(2) Adding an alkali solution to the aluminum salt solution to precipitate aluminum hydroxide particles, and adding a phosphorous compound and optionally at least one dopant to the aqueous solution before, during or after the precipitation,
(3) Evaporation of the water, followed by drying of the precipitated product of step (2) to form the dried form of alumina containing particle and alkali salt,
(4) Calcination, preferably at temperatures of 900-1400° C., for 0.5-10 h, preferably 1-6 h, of the dried form obtained in step (3) to obtain $Al_2O_3$ flakes in the molten salt,
(5) Removing the water soluble part of the calcined material obtained in step (4),
(6) Adjust the particle size and thickness, for example by sieving, milling and/or sedimentation.

Examples for suitable aluminum salts are aluminum sulfate, aluminum chloride, aluminum nitrate, poly aluminum chloride, aluminum hydroxide, boehmite, basic aluminum sulfate and combinations thereof.

Examples for suitable alkali metal salts which act as mineralizer, include sodium sulfate, potassium sulfate, lithium sulfate, magnesium sulfate, sodium chloride and potassium chloride.

The phosphoric compound is preferably selected from phosphoric acid, phosphates, diphosphoric acid, sodium phosphate, ammonium phosphate dibasic and potassium phosphate. The amount of one or more phosphorous compound(s) is preferably 0.05-2 wt. % based on the alumina flakes.

The preferred example of the pH controlling agent for the precipitation is ammonia, sodium hydroxide, potassium hydroxide, sodium carbonate, potassium carbonate and combinations thereof.

To control the particle size, thickness, optical properties and/or surface morphology it could be helpful to add one or more dopants in amounts of 0.01-5 wt. % based on the $Al_2O_3$ flake.

The dopant is preferably selected from the following group of compounds: $TiO_2$, $ZrO_2$, $SiO_2$, $In_2O_3$, $SnO_2$, $ZnO$ and combinations thereof.

In a preferred embodiment the dopant is $TiO_2$, preferably used in amounts of 0.05-3 wt. % based on the $Al_2O_3$ flakes.

The $Al_2O_3$ flakes according to the present invention are highly suitable as substrate in the preparation of effect pigments. To this end, they are preferably coated with at least one high refractive index layer, like at least one layer of a metal oxide, such as, for example, $TiO_2$, $ZrO_2$, $SnO_2$, $ZnO$, $Ce_2O_3$, $Fe_2O_3$, $Fe_3O_4$, $FeTiO_5$, $Cr_2O_3$, $CoO$, $Co_3O_4$, $VO_2$, $V_2O_3$, $NiO$, furthermore of titanium suboxides ($TiO_2$ partially reduced with oxidation states from <4 to 2, such as the lower oxides $Ti_3O_5$, $Ti_2O_3$, $TiO$), titanium oxynitrides, $FeO(OH)$, thin semitransparent metal layer, for example comprising Al, Fe, Cr, Ag, Au, Pt or Pd, or combinations thereof. The $TiO_2$ layer may be in the rutile or anatase modification. In general, the highest quality and gloss and at the same time the most stable effect pigments are obtained when the $TiO_2$ is in the rutile modification. In order to obtain the rutile modification, an additive can be used which is able to direct the $TiO_2$ into the rutile modification. Useful rutile directors such as tin dioxide are disclosed in the U.S. Pat. Nos. 4,038,099 and 5,433,779 and EP 0 271 767. Preferred effect pigments based on $Al_2O_3$ flakes are coated with one or more layers of metal oxides, preferably with one metal-oxide layer only, in particular with $TiO_2$, $Fe_2O_3$, $Fe_3O_4$, $SnO_2$, $ZrO_2$ or $Cr_2O_3$. Especially preferred are $Al_2O_3$ flakes coated with $TiO_2$ or $Fe_2O_3$.

The thickness of each high-refractive-index layer depends on the desired interference color. The thickness of each layer on the surface of the $Al_2O_3$ flakes is preferably 20-400 nm, preferably 30-300 nm, in particular 30-200 nm.

The number of layers on the surface of the $Al_2O_3$ flakes is preferably one or two, furthermore three, four, five, six or seven layers.

In particular, interference packages consisting of high- and low-refractive-index layers on the surface of the $Al_2O_3$ flakes result in effect pigments having increased gloss and a further increased interference color or color flop.

Suitable colorless low-refractive-index materials for coating are preferably metal oxides or the corresponding oxide hydrates, such as, for example, $SiO_2$, $Al_2O_3$, $AlO(OH)$, $B_2O_3$, compounds such as $MgF_2$ or a mixture of the said metal oxides.

In case of multilayers applied on the surface of the $Al_2O_3$ flakes the interference system is, in particular, a $TiO_2$—$SiO_2$—$TiO_2$ layer sequence.

Furthermore, the effect pigments according to the invention may also have a semitransparent metal layer as outer layer. Coatings of this type are known, for example, from DE 38 25 702 A1. The metal layers are preferably chromium or aluminum layers having layer thicknesses of 5-25 nm.

$Al_2O_3$ flakes can also be coated with one or more layers of a metal or metal alloy selected e.g. from chromium, nickel, silver, bismuth, copper, tin, or hastalloy. $Al_2O_3$ flakes coated with a metal sulfide are coated with sulfides e.g. of tungsten, molybdenum, cerium, lanthanum or rare earth elements.

Furthermore, the effect pigments based on $Al_2O_3$ flakes can be finally coated with an organic dye as a top coat, preferably with Prussian Blue or Carmine Red.

Particularly preferred effect pigments based on the $Al_2O_3$ flakes according to the invention have the following layer sequence(s):

$Al_2O_3$ flake+$TiO_2$
$Al_2O_3$ flake+$TiO_2$/$Fe_2O_3$ $Al_2O_3$ flake+$Fe_2O_3$
$Al_2O_3$ flake+$TiO_2$+$Fe_2O_3$
$Al_2O_3$ flake+$TiO_2$+$Fe_3O_4$
$Al_2O_3$ flake+$TiO_2$+$SiO_2$+$TiO_2$
$Al_2O_3$ flake+$Fe_2O_3$+$SiO_2$+$TiO_2$
$Al_2O_3$ flake+$TiO_2$/$Fe_2O_3$+$SiO_2$+$TiO_2$
$Al_2O_3$ flake+$TiO_2$+$SiO_2$+$TiO_2$/$Fe_2O_3$
$Al_2O_3$ flake+$TiO_2$+$SiO_2$
$Al_2O_3$ flake+$TiO_2$+$SiO_2$/$Al_2O_3$
$Al_2O_3$ flake+$TiO_2$+$Al_2O_3$
$Al_2O_3$ flake+$SnO_2$
$Al_2O_3$ flake+$SnO_2$+$TiO_2$
$Al_2O_3$ flake+$SnO_2$+$Fe_2O_3$
$Al_2O_3$ flake+$SiO_2$
$Al_2O_3$ flake+$SiO_2$+$TiO_2$
$Al_2O_3$ flake+$SiO_2$+$TiO_2$/$Fe_2O_3$
$Al_2O_3$ flake+$SiO_2$+$Fe_2O_3$
$Al_2O_3$ flake+$SiO_2$+$TiO_2$+$Fe_2O_3$
$Al_2O_3$ flake+$SiO_2$+$TiO_2$+$Fe_3O_4$
$Al_2O_3$ flake+$SiO_2$+$TiO_2$+$SiO_2$+$TiO_2$
$Al_2O_3$ flake+$SiO_2$+$Fe_2O_3$+$SiO_2$+$TiO_2$
$Al_2O_3$ flake+$SiO_2$+$TiO_2$/$Fe_2O_3$+$SiO_2$+$TiO_2$
$Al_2O_3$ flake+$SiO_2$+$TiO_2$+$SiO_2$+$TiO_2$/$Fe_2O_3$
$Al_2O_3$ flake+$SiO_2$+$TiO_2$+$SiO_2$
$Al_2O_3$ flake+$SiO_2$+$TiO_2$+$SiO_2$/$Al_2O_3$
$Al_2O_3$ flake+$SiO_2$+$TiO_2$+$Al_2O_3$
$Al_2O_3$ flake+$TiO_2$+Prussian Blue
$Al_2O_3$ flake+$TiO_2$+Carmine Red The $TiO_2$ layer(s) in the preferred embodiments mentioned above can be in the rutile or anatase modification. The $Al_2O_3$ flakes mentioned above in the preferred embodiments can be doped or undoped.

In this application, the term "coating" or "layer" is taken to mean the complete enveloping of the $Al_2O_3$ flakes according to the invention.

The effect pigments based on doped or undoped $Al_2O_3$ flakes preferably consist of 40-90 wt. % of $Al_2O_3$ flakes and 10-60 wt. % of the coating based on the total pigment.

The $Al_2O_3$ flakes can be coated by wet chemical coating, by CVD or PVD processes.

The coating of the α-$Al_2O_3$ flakes with one or more layers, preferably one or more metal oxide layers, is preferably carried out by wet-chemical methods, it being possible to use the wet-chemical coating methods developed for the preparation of pearlescent pigments. Methods of this type are described, for example, in DE 14 67 468, DE 19 59 988, DE 20 09 566, DE 22 14 545, DE 22 15 191, DE 22 44 298, DE 23 13 331, DE 15 22 572, DE 31 37 808, DE 31 37 809, DE 31 51 343, DE 31 51 354, DE 31 51 355, DE 32 11 602, DE 32 35 017 or also in further patent documents and other publications known to the person skilled in the art.

In the case of wet coating, the $Al_2O_3$ flakes are suspended in water, and one or more hydrolysable metal salts are added at a pH which is suitable for hydrolysis, which is selected in such a way that the metal oxides or metal-oxide hydrates are precipitated directly onto the flakes without secondary precipitations occurring. The pH is usually kept constant by simultaneous metered addition of a base and/or acid. The pigments are subsequently separated off, washed and dried at 50-150° C. for 6-18 h and calcined for 0.5-3 h, where the calcination temperature can be optimised with respect to the respective coating present. In general, the calcination temperatures are 500-1000° C., preferably 600-900° C. If desired, the pigments can be separated off after application of individual coatings, dried and optionally calcined and then re-suspended again for the application of the further layers.

The application of a $SiO_2$ layer to the $Al_2O_3$ flake and/or to the already coated $Al_2O_3$ flake is generally carried out by addition of a potassium or sodium water-glass solution at a suitable pH.

Furthermore, the coating can also be carried out in a fluidised-bed reactor by gas-phase coating, it being possible to use, for example, the methods proposed in EP 0 045 851 and EP 0 106 235 for the preparation of pearlescent pigments correspondingly.

The hue and chroma of the effect pigment based on $Al_2O_3$ flakes according to the invention can be varied in very broad limits through the different choice of the coating amounts or the layer thicknesses resulting therefrom. Fine tuning for a certain hue and chroma can be achieved beyond the pure choice of amount by approaching the desired color under visual or measurement technology control.

In order to increase the light, water and weather stability, it is frequently advisable, depending on the area of application, to subject the finished pigment to post-coating or post-treatment. Suitable post-coatings or post-treatments are, for example, the processes described in DE 22 15 191 C2, DE-A 31 51 354, DE-A 32 35 017 or DE-A 33 34 598. This post-coating further increases the chemical and photochemical stability or simplifies the handling of the pigment, in particular the incorporation into various media. In order to improve the weatherability, dispersibility and/or compatibility with the user media, it is possible, for example, for functional coatings of $Al_2O_3$ or $ZrO_2$ or mixtures thereof to be applied to the pigment surface. Furthermore, organic post-coatings are possible, for example with silanes, as described, for example, in EP 0090259, EP 0 634 459, WO 99/57204, WO 96/32446, WO 99/57204, U.S. Pat. Nos. 5,759,255, 5,571,851, WO 01/92425 or in J. J. Ponjeé, Philips Technical Review, Vol. 44, No. 3, 81 ff. and P. H. Harding J. C. Berg, J. Adhesion Sci. Technol. Vol. 11 No. 4, pp. 471-493.

In accordance with the present invention, an effect pigment based on $Al_2O_3$ flakes having the desired size distribution has been found useful in all types of compositions, including plastics, cosmetics, and, in particular in automotive paints.

The $Al_2O_3$ flakes and the effect pigments based on $Al_2O_3$ flakes according to the invention are compatible with a multiplicity of color systems, preferably from the area of paints, automotive coatings, industrial coatings, and printing inks and cosmetic formulations. For the preparation of printing inks for, for example, gravure printing, flexographic printing, offset printing and offset overvarnishing, a multiplicity of binders, in particular water-soluble grades, as sold, for example, by BASF, Marabu, Pröll, Sericol, Hartmann, Gebr. Schmidt, Sicpa, Aarberg, Siegberg, GSB-Wahl, Follmann, Ruco or Coates Screen INKS GmbH, is suitable. The printing inks can be water-based or solvent-based. The $Al_2O_3$ flakes and the effect pigments according to the invention are furthermore also suitable for the laser marking of paper and plastics and for applications in the agricultural sector, for example for greenhouse sheeting, and, for example, for the coloring of tent awnings.

It goes without saying that, for the various applications, the coated and uncoated $Al_2O_3$ flakes according to the present invention can also advantageously be used in blends with organic dyes, organic pigments or other pigments, such as, for example, transparent and opaque white, colored and black pigments, and with flake-form iron oxides, organic pigments, holographic pigments, LCPs (liquid crystal polymers) and conventional transparent, colored and black luster pigments based on metal oxide-coated mica and $SiO_2$ flakes, etc. The pigments according to the invention can be mixed in any ratio with commercially available pigments and fillers.

Fillers which may be mentioned are, for example, natural and synthetic mica, nylon powder, pure or filled melamine resins, talc, $SiO_2$, glasses, kaolin, oxides or hydroxides of aluminum, magnesium, calcium or zinc, BiOCl, barium sulfate, calcium sulfate, calcium carbonate, magnesium carbonate, carbon, and physical or chemical combinations of these sub-stances. There are no restrictions regarding the particle shape of the filler. It can be, for example, flake-form, spherical or needle-shaped in accordance with requirements.

The $Al_2O_3$ flakes and the effect pigments based on $Al_2O_3$ flakes according to the invention are simple and easy to handle. The $Al_2O_3$ flakes and the effect pigments based on $Al_2O_3$ flakes can be incorporated into the system in which it is used by simple stirring. Laborious milling and dispersing of the $Al_2O_3$ flakes and the effect pigments is not necessary.

The $Al_2O_3$ flakes and the effect pigments based on $Al_2O_3$ flakes according to the invention can be used for pigmenting coating materials, printing inks, plastics, agricultural films, button pastes, for the coating of seed, for the coloring of food, coatings of medicaments or cosmetic formulations. The concentration of the $Al_2O_3$ flakes and the effect pigments in the system in which it is to be used for pigmenting is generally between 0.01 and 50% by weight, preferably between 0.1 and 5% by weight, based on the overall solids content of the system. This concentration is generally dependent on the specific application.

Plastics containing the $Al_2O_3$ flakes and the effect pigments based on $Al_2O_3$ flakes according to the invention in amounts of 0.1 to 50% by weight, in particular from 0.5 to 7% by weight, are frequently notable for a particular gloss and shimmer effect.

In the coating sector, especially in automotive coating and automotive finishing, the effect pigments based on $Al_2O_3$ flakes according to the invention are employed in amounts of 0.5-10% by weight.

In the coating material, the $Al_2O_3$ flakes and the effect pigments based on $Al_2O_3$ flakes according to the invention have the advantage that the desired color and gloss is obtained by a single-layer coating (one-coat systems or as a base coat in a two-coat system).

In the pigmentation of binder systems, for example for paints and printing inks for intaglio, offset or screen printing, the effect pigments based on $Al_2O_3$ flakes with Stapa®-aluminum and gold bronze pastes from Eckart GmbH have proven particularly suitable. The effect pigment is incorporated into the printing ink in amounts of 2-50% by weight, preferably 5-30% by weight and, in particular, 8-15% by weight. The printing inks containing the effect pigment according to the invention in combination with a metal effect pigment exhibits purer hues and is of improved printability owing to the good viscosity values.

The invention likewise provides pigment preparations containing coated or uncoated $Al_2O_3$ flakes according to the present invention and further effect pigments, binders and, if desired, additives, the said preparations being in the form of substantially solvent-free, free-flowing granules. Such granules contain up to 95% by weight of the $Al_2O_3$ flakes or the effect pigments according to the invention. A pigment preparation in which the effect pigment based on $Al_2O_3$ flakes of the invention is pasted up with a binder and with water and/or an organic solvent, with or without additives, and the paste is subsequently dried and brought into a compact particulate form, e.g. granules, pellets, briquettes, a masterbatch or tablets, is particularly suitable as a precursor for printing inks.

The invention thus also relates to the use of the coated (=effect pigments) or uncoated $Al_2O_3$ flakes in formulations from the areas of paints, coatings, automobile coatings, automotive finishing, industrial coatings, paints, powder coatings, printing inks, security printing inks, plastics, ceramic materials, cosmetics. The coated and uncoated $Al_2O_3$ flakes can furthermore be employed in glasses, in paper, in paper coating, in toners for electrophotographic printing processes, in seed, in greenhouse sheeting and tarpaulins, in thermally conductive, self-supporting, electrically insulating, flexible sheets for the insulation of machines or devices, as absorber in the laser marking of paper and plastics, as absorber in the laser welding of plastics, in pigment pastes with water, organic and/or aqueous solvents, in pigment preparations and dry preparations, such as, for example, granules, for example in clear coats in the industrial and automobile sectors, in sunscreens, as filler, in particular in automobile coatings and automotive finishing.

All percentage data in this application are percent by weight, unless indicated otherwise.

The following examples are intended to explain the invention in greater detail, but without restricting it. Above and below, all percentages are percent by weight.

EXAMPLES

Comparative Example 1 (Example 2 of U.S. Pat. No. 5,702,519)

In 300 ml of deionized water are dissolved 111.9 g of aluminum sulfate 18-hydrate, 57.3 g of anhydrous sodium sulfate, and 46.9 g of potassium sulfate by heating above 60° C. To the resulting solution is added 1.0 g of 34.4% solution of titanyl sulfate. The resulting solution is designated as the aqueous solution (a).

In 150 ml of deionized water are 0.45 g of sodium tertiary phosphate 12-hydrate and 54.0 g of sodium carbonate. The resulting solution is designated as the aqueous solution (b).

The aqueous solution (b) is added with stirring to the aqueous solution (a) kept at about 60° C. Stirring is continued for 15 minutes. The resulting mixture of the two solutions is a gel. This gel is evaporated to dryness, and the dried product is heated at 1200° C. for 5 hours. Water is added to the heated product to dissolve free sulfate. Insoluble solids are filtered off, washed with water, and finally dried. The obtained alumina flake is examined by X-ray diffractometry. The diffraction pattern has only peaks attributed to corundum structure (α-alumina structure).

$D_{50}$ is 13.0 μm and $D_{90}$ is 22.0 μm and the thickness is 200 nm.

Example 1: Preparation of the $Al_2O_3$ Flakes 74.6 g of aluminum sulfate 18-hydrate, 5.7 g of transition alumina (C10W: Nippon Light Metal Co., Ltd.), 57.3 g of anhydrous sodium sulfate and 46.9 g of potassium sulfate are dissolved in 450 ml of deionized water by heating above 60° C. To the resulting solution is added 1.2 g of 34.4% solution of titanyl sulfate. The resulting solution is designated as the aqueous solution (a).

In 300 ml of deionized water are 0.010 g of sodium tertiary phosphate 12-hydrate and 55.0 g of sodium carbonate. The resulting solution is designated as the aqueous solution (b).

The aqueous solution (b) is added with stirring to the aqueous solution (a) kept at about 60° C. Stirring is continued for 30 minutes. The resulting mixture of the two solutions is a slurry. This slurry is evaporated to dryness, and the dried product is heated at 1230° C. for 4.5 hours. Water is added to the heated product to dissolve free sulfate. Insoluble solids are filtered off, washed with water, and filtered by sieve with 25 micron opening. And finally it was dried. The obtained alumina flake is examined by X-ray diffractometry. The diffraction pattern have only peaks attributed to corundum structure (α-alumina structure).

$D_{50}$ is 19.6 μm, $D_{90}$ is 38.8 μm and the average thickness is 700 nm.

Comparative Example 1.1: Coating of $Al_2O_3$ Flakes 20 g of alumina flakes of Comparative Example 1 are suspended in 400 ml of deionized water. To the resulting suspension (kept at about 65° C.) is added a solution containing 125 g of $TiCl_4$ per liter. Simultaneously a 10% solution of NaOH was added to keep the pH at 2.1. The addition of the $TiCl_4$ solution is stopped when the resulting product takes on a silvery color. The suspending solids are filtered off, washed with water and dried. Finally, the dried solids are calcined at 850° C. for 30 minutes to give a whitish and a little glossy pearlescent pigment.

Example 1.1: Coating of $Al_2O_3$ Flakes 20 g of alumina flakes of Example 1 are suspended in 400 ml of deionized water. To the resulting suspension (kept at about 65° C.) is added a solution containing 125 g of $TiCl_4$ per liter. Simultaneously a 10% solution of NaOH was added to keep the pH at 2.1. The addition of the $TiCl_4$ solution is stopped when the resulting product takes on a silvery color. The suspending solids are filtered off, washed with water and dried. Finally, the dried solids are calcined at 850° C. for 30 minutes to give a highly whitish and glossy pearlescent pigment with a strong glitter effect.

Comparative Example 1.2: Coating of $Al_2O_3$ Flakes 20 g alumina flakes of Comparative Example 1 are suspended in 400 ml of deionized water. To the resulting suspension (kept at about 75° C.) are added a solution containing 300 g of $FeCl_3$ per liter. Simultaneously a 10% solution of NaOH was added to keep the pH at 3.0. The addition of the $FeCl_3$ solution was stopped when the resulting product takes on a most reddish color. The suspending solids are filtered off, washed with water, and dried. Finally, the dried solids are calcined at 800° C. for 30 minutes to give a moderate luster and brownish red colored pearlescent pigment.

Example 1.2: Coating of $Al_2O_3$ Flakes 20 g alumina flakes of Example 1 are suspended in 400 ml of deionized water. To the resulting suspension (kept at about 75° C.) are added a solution containing 300 g of $FeCl_3$ per liter. Simultaneously a 10% solution of NaOH was added to keep the pH at 3.0. The addition of the $FeCl_3$ solution was stopped when the resulting product takes on a most reddish color. The suspending solids are filtered off, washed with water, and dried. Finally, the dried solids are calcined at 800° C. for 30 minutes to give a high luster and pure red colored pearlescent pigment with a strong glitter effect.

Comparative Example 1.3: Coating of $Al_2O_3$ Flakes 20 g alumina flakes of Comparative Example 1 are suspended in 400 ml of deionized water. To the resulting suspension (kept at about 65° C.) is added a solution containing 50 g of $SnCl_4$ per liter. Simultaneously a 10% solution of NaOH is added to keep the pH at 2.1 until the total adding volume of $SnCl_4$ solution become 17 ml. Next the solution containing 125 g of $TiCl_4$ per liter was added to the resulting suspension. Simultaneously a 10% solution of NaOH is added to keep the pH at 2.1. The addition of the $TiCl_4$ solution is stopped when the resulting product takes on a silvery color. The suspending solids are filtered off, washed with water, and dried. Finally, the dried solids are calcined at 850° C. for 30 minutes to give a whitish and a little glossy pearlescent pigment.

Example 1.3: Coating of $Al_2O_3$ Flakes 20 g alumina flakes of Example 1 are suspended in 400 ml of deionized water. To the resulting suspension (kept at about 65° C.) is added a solution containing 50 g of $SnCl_4$ per liter. Simultaneously a 10% solution of NaOH is added to keep the pH at 2.1 until the total adding volume of $SnCl_4$ solution become 17 ml. Next the solution containing 125 g of $TiCl_4$ per liter was added to the resulting suspension. Simultaneously a 10% solution of NaOH is added to keep the pH at 2.1. The addition of the $TiCl_4$ solution is stopped when the resulting product takes on a silvery color. The suspending solids are filtered off, washed with water, and dried. Finally, the dried solids are calcined at 850° C. for 30 minutes to give a highly whitish and highly glossy pearlescent pigment with a strong glitter effect. At the luster angle, the glossy appearance can be seen at a more wider angle compared to Comparative Example 1.3.

Comparative Example 1.4: Coating of $Al_2O_3$ Flakes 20 g alumina flakes of Comparative Example 1 are suspended in 400 ml of deionized water. To the resulting suspension (kept at about 65° C.) is added a solution containing 125 g of $TiCl_4$ per liter. Simultaneously a 10% solution of NaOH is added to keep the pH at 2.1. The addition of the $TiCl_4$ solution is stopped when the resulting product takes on a yellowish color. Then a solution containing 50 g of $Na_2SiO_3$ per liter is added to the resulted suspension. Simultaneously a 10% solution of HCl is added to keep the pH at 7. Next a solution containing 125 g of $TiCl_4$ per liter is added to the resulted suspension. Simultaneously a 10% solution of NaOH is added to keep the pH at 2.1. The addition of the $TiCl_4$ solution is stopped when the resulting product takes on a bluish color. The suspending solids are filtered off, washed with water, and dried. Finally, the dried solids are calcined at 850° C. for 30 minutes to give a blue-whitish and a little glossy pearlescent pigment.

Example 1.4: Coating of $Al_2O_3$ Flakes 20 g alumina flakes of Example 1 are suspended in 400 ml of deionized water. To the resulting suspension (kept at about 65° C.) is added a solution containing 125 g of $TiCl_4$ per liter. Simultaneously a 10% solution of NaOH is added to keep the pH at 2.1. The addition of the $TiCl_4$ solution is stopped when the resulting product takes on a yellowish color. Then a solution containing 50 g of $Na_2SiO_3$ per liter is added to the resulted suspension. Simultaneously a 10% solution of HCl is added to keep the pH at 7. Next a solution containing 125 g of TiCl$_4$ per liter is added to the resulted suspension. Simultaneously a 10% solution of NaOH is added to keep the pH at 2.1. The addition of the TiCl$_4$ solution is stopped when the resulting product takes on a bluish color. The suspending solids are filtered off, washed with water, and dried. Finally, the dried solids are calcined at 850° C. for 30 minutes to give a highly bluish and highly glossy pearlescent pigment with a strong glitter effect. At the luster angle, the stronger bluish color and higher glossy appearance can be seen at a more wider angle compared to Comparative Example 1.4.

Measurements

Evaluation for Particle Size $D_{10}$, $D_{50}$ and $D_{90}$ $D_{10}$, $D_{50}$ and $D_{90}$ of alumina flake are evaluated by using Malvern MS2000.

Determination of the Thickness and Particle Size and the Thickness Distribution 0.01 g/l of the alumina flake slurry is prepared and 0.1 ml of this slurry is dropped onto a flat substrate like a silicon wafer. The substrate is dried and cut to adequate size. The substrate is set with almost vertically tilted angle on the base of SEM (Scanning electronic microscope) and the thickness of the alumina flake is determined.

The thickness of more than 100 alumina flakes is measured for the calculation of the thickness distribution. The standard deviation of the thickness is calculated with the Gaussian distribution equation.

Preparation for a Sprayed Panel

A base coat paint for automobiles is prepared according to the following formulation.

| <Base coat system> Acrylic-melamine resin system | |
|---|---|
| "Acrydic ® 47-712"* | 70 pbw |
| "Superbekkamine ® G821-60"** | 30 pbw |
| Toluene | 30 pbw |
| Ethyl acetate | 50 pbw |

*Acrylic resin from Dainippon Ink & Chemicals, Inc.
**Melamine resin from Dainippon Ink & Chemicals, Inc.

| <Base coat system> Acrylic-melamine resin system | |
|---|---|
| n-Butanol | 110 pbw |
| Solvesso ® #150 | 40 pbw |

The above acrylic-melamine resin system (100 pbw) is incorporated with 20 pbw of the pearlescent pigment according to one of the above given Examples. The resulting compound is diluted with a thinner so that the resulting paint has an adequate consistency for spraying (12-15 seconds, for cup #4). This paint is applied to a substrate by spraying to form a base coat layer.

The base coated layer is coated further with a colorless top clear coat paint, which is prepared according to the following formulation.

<Top Clear Coat System>

| <Top clear coat system> | |
|---|---|
| "Acrydic ® 47-712" | 14 pbw |
| "Superbekkamine ® L117-60" | 6 pbw |
| Toluene | 4 pbw |
| MIBK | 4 pbw |
| Butyl cellosolve | 3 pbw |

The top clear coating is exposed to air at 40° C. for 30 minutes and then cured at 135° C. for 30 minutes.

Haze-gloss (BYK) is the analyzing equipment to evaluate luster and haze. In this patent application, the value of mirror gloss on 60° is measured by Haze-gloss and represents the value of the luster. Compared to the prior art the coated Al$_2$O$_3$ flakes show very high values for the luster. High luster values are necessary to achieve a good appearance in the applications. The haze values measured by this equipment are affected by spreading of the reflection angle. In this patent application, the wider spreading angle is important for the pearlescent appearance. The coated Al$_2$O$_3$ flakes according to the present invention show very high haze-gloss values. To differentiate the evaluation result, panels are used which are sprayed with a base coat before they are coated with a top clear coat for the haze-gloss measurement.

Wave-scan dual (BYK) is used as the analyzing equipment to measure the surface flatness of the samples. Wa value represents the cyclic flatness in the range of 0.1-0.3 mm. A smaller value in this patent application represents a flatter surface showing the advantages of the pigments according to the present invention.

Sprayed panels with a top clear coat are measured for Wa. Flatter surfaces have better finishing appearance.

BYK-mac is used to evaluate glitter effect. The SG value represents the glitter.

Wave-scan dual (BYK) is used to evaluate the finishing quality of paint.

The optical properties of the pearlescent pigments according to the above given examples are summarized in the following table:

TABLE 1

| Al$_2$O$_3$ flakes | TiO$_2$ coated Al$_2$O$_3$ flakes | Particle size distribution of the Al$_2$O$_3$ flakes (μm) | | | Average thickness of the Al$_2$O$_3$ flakes (nm) | Optical properties of TiO$_2$ coated Al$_2$O$_3$ flakes | |
|---|---|---|---|---|---|---|---|
| | | $D_{10}$ | $D_{50}$ | $D_{90}$ | | SG | Wa |
| E1 | E1.1 | 9.0 | 19.6 | 38.8 | 700 | 8.5 | 13 |
| CE1 | CE1.1 | 4.8 | 13.0 | 22.0 | 200 | 2 | 21 |

The entire disclosures of all applications, patents and publications, cited herein and of corresponding European Application No. 13002294.0, filed Apr. 30, 2013 are incorporated by reference herein.

The invention claimed is:

1. A coating, automobile coating, automotive finishing or industrial coating, comprising uncoated Al$_2$O$_3$ flakes having a thickness of ≥500 nm and a $D_{10}$-value of ≤ 9.0 μm and a $D_{50}$-value of 15-30 μm and a $D_{90}$-value of 30-45 μm, and/or coated Al$_2$O$_3$ flakes having a thickness of ≥500 μm and a $D_{10}$-value of ≤9.0 μm and a $D_{50}$-value of 15-30 μm and a $D_{90}$-value of 30-45 μm, which have been coated with a coating selected from the group consisting of at least one layer of a metal oxide, mixtures of at least two metal oxides, metal, metal sulphide, titanium suboxide, titanium oxynitride, FeO(OH), metal alloys and rare earth compounds, and wherein the coated and/or uncoated Al$_2$O$_3$ flakes are α-alumina flakes.

2. The coating, automobile coating, automotive finishing or industrial coating according to claim 1, wherein the coated and/or uncoated Al$_2$O$_3$ flakes have a $D_{10}$-value of 9.0 μm.

3. The coating, automobile coating, automotive finishing or industrial coating according to claim 1, wherein the coated and/or uncoated $Al_2O_3$ flakes have a $D_{90}$-value of 30-40 µm.

4. The coating, automobile coating, automotive finishing or industrial coating according to claim 1, wherein the coated and/or uncoated $Al_2O_3$ flakes have a particle thickness of 550-1000 nm.

5. The coating, automobile coating, automotive finishing or industrial coating according to claim 1, wherein the coated and/or uncoated $Al_2O_3$ flakes have been doped with a dopant selected from the group consisting of $TiO_2$, $ZrO_2$, $SiO_2$, $SnO_2$, $In_2O_3$, ZnO and combinations thereof.

6. The coating, automobile coating, automotive finishing or industrial coating according to claim 5, wherein the amount of doping is 0.01-5% by weight based on the total weight of the $Al_2O_3$ flake.

7. The coating, automobile coating, automotive finsihing or industrial coating according to claim 5, wherein the coated and/or uncoated $Al_2O_3$ flakes have been doped with $TiO_2$.

8. The coating, automobile coating, automotive finishing or industrial coating according to claim 1, which contain the $Al_2O_3$ flakes coated with a coating selected from the group consisting of at least one layer of a metal oxide, mixtures of at least two metal oxides, metal, metal sulphide, titanium suboxide, titanium oxynitride, FeO(OH), metal alloys and rare earth compounds.

9. The coating, automobile coating, automotive finishing or industrial coating according to claim 1, wherein the $Al_2O_3$ flakes have been coated with at least one layer of a metal oxide or a mixture of at least two metal oxides.

10. The coating, automobile coating, automotive finishing or industrial coating according to claim 1, wherein the $Al_2O_3$ flakes have been coated with the following layer sequence:

$Al_2O_3$ flake+$TiO_2$
$Al_2O_3$ flake+$TiO_2$/$Fe_2O_3$
$Al_2O_3$ flake+$Fe_2O_3$
$Al_2O_3$ flake+$TiO_2$+$Fe_2O_3$
$Al_2O_3$ flake+$TiO_2$+$Fe_3O_4$
$Al_2O_3$ flake+$TiO_2$+$SiO_2$+$TiO_2$
$Al_2O_3$ flake+$Fe_2O_3$+$SiO_2$+$TiO_2$
$Al_2O_3$ flake+$TiO_2$/$Fe_2O_3$+$SiO_2$+$TiO_2$
$Al_2O_3$ flake+$TiO_2$+$SiO_2$+$TiO_2$/$Fe_2O_3$
$Al_2O_3$ flake+$TiO_2$+$SiO_2$
$Al_2O_3$ flake+$TiO_2$+$SiO_2$/$Al_2O_3$
$Al_2O_3$ flake+$TiO_2$+$Al_2O_3$
$Al_2O_3$ flake+$SnO_2$
$Al_2O_3$ flake+$SnO_2$+$TiO_2$
$Al_2O_3$ flake+$SnO_2$+$Fe_2O_3$
$Al_2O_3$ flake+$SiO_2$
$Al_2O_3$ flake+$SiO_2$+$TiO_2$
$Al_2O_3$ flake+$SiO_2$+$TiO_2$/$Fe_2O_3$
$Al_2O_3$ flake+$SiO_2$+$Fe_2O_3$
$Al_2O_3$ flake+$SiO_2$+$TiO_2$+$Fe_2O_3$
$Al_2O_3$ flake+$SiO_2$+$TiO_2$+$Fe_3O_4$
$Al_2O_3$ flake+$SiO_2$+$TiO_2$+$SiO_2$+$TiO_2$
$Al_2O_3$ flake+$SiO_2$+$Fe_2O_3$+$SiO_2$+$TiO_2$
$Al_2O_3$ flake+$SiO_2$+$TiO_2$/$Fe_2O_3$+$SiO_2$+$TiO_2$
$Al_2O_3$ flake+$SiO_2$+$TiO_2$+$SiO_2$+$TiO_2$/$Fe_2O_3$
$Al_2O_3$ flake+$SiO_2$+$TiO_2$+$SiO_2$
$Al_2O_3$ flake+$SiO_2$+$TiO_2$+$SiO_2$/$Al_2O_3$
$Al_2O_3$ flake+$SiO_2$+$TiO_2$+$Al_2O_3$
$Al_2O_3$ flake+$TiO_2$+Prussian Blue or
$Al_2O_3$ flake+$TiO_2$+Carmine Red.

11. The coating, automobile coating, automotive finishing or industrial coating according to claim 1, wherein the $Al_2O_3$ flakes have been coated with $TiO_2$ in the rutile or anatase modification.

12. The coating, automobile coating, automotive finishing or industrial coating according to claim 1, wherein the $Al_2O_3$ flakes have been coated with $TiO_2$ in the rutile modification.

13. The coating, automobile coating, automotive finishing or industrial coating according to claim 1, wherein the coated $Al_2O_3$ flakes consist of 40-90 wt. % of $Al_2O_3$ flakes and 10-60 wt. % of the coating based on the total weight of the $Al_2O_3$ flake.

14. The coating, automobile coating, automotive finishing or industrial coating according to claim 1, which is a one coat system which has a single-layer coating.

15. The coating, automobile coating, automotive finishing or industrial coating according to claim 1, which is a two-coat system.

16. The coating, automobile coating, automotive finishing or industrial coating according to claim 1, wherein the coating, automobile coating, automotive finishing or industrial coating contains 0.01 to 50% by weight of the coated and/or uncoated $Al_2O_3$ flakes.

17. A base coat in a two-coat system, wherein the base coat is a coating, automobile coating, automotive finishing or industrial coating according to claim 1.

18. A coating, automobile coating, automotive finishing or industrial coating, comprising coated $Al_2O_3$ flakes having a thickness of ≥500 nm and a $D_{10}$-value of ≤9.0 µm and a $D_{50}$-value of 15-30 µm and a $D_{90}$-value of 30-45 µm, which have been coated with a coating selected from the group consisting of at least one layer of a metal oxide, mixtures of at least two metal oxides, metal, metal sulphide, titanium suboxide, titanium oxynitride, FeO(OH), metal alloys and rare earth compounds, wherein the coated and/or uncoated $Al_2O_3$ flakes are α-alumina flakes.

19. A coating, automobile coating, automotive finishing or industrial coating, comprising uncoated $Al_2O_3$ flakes having a thickness of ≥500 nm and a $D_{10}$-value of ≤9.0 µm and a $D_{50}$-value of 15-30 µm and a $D_{90}$-value of 30-45 µm, and/or coated $Al_2O_3$ flakes having a thickness of ≥500 nm and a $D_{10}$-value of ≤9.0 µm and a $D_{50}$-value of 15-30 µm and a $D_{90}$-value of 30-45 µm, which have been coated with a coating selected from the group consisting of at least one layer of a metal oxide, mixtures of at least two metal oxides, metal, metal sulphide, titanium suboxide, titanium oxynitride, FeO(OH), metal alloys and rare earth compounds, wherein the coating, automobile coating, automotive finishing or industrial coating contains 0.5 to 10% by weight the coated and/or uncoated $Al_2O_3$ flakes, and wherein the coated and/or uncoated $Al_2O_3$ flakes are α-alumina flakes.

20. The coating, auntombile coating, automotive finishing or industrial coating according to claim 19, wherein the coated and/or uncoated $Al_2O_3$ flakes have a $D_{10}$-value of 9.0 µm.

* * * * *